(12) United States Patent  (10) Patent No.: US 6,497,520 B2
Omiya  (45) Date of Patent: Dec. 24, 2002

(54) COMPACT CAMERA

(75) Inventor: Akio Omiya, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/002,161

(22) Filed: Dec. 5, 2001

(65) Prior Publication Data

US 2002/0071675 A1 Jun. 13, 2002

(30) Foreign Application Priority Data

Dec. 11, 2000 (JP) ........................ 2000-376114

(51) Int. Cl.[7] .................. G03B 1/00; G03B 17/02; G03B 13/10; G03B 15/06; G03B 15/02
(52) U.S. Cl. .................. 396/411; 396/538; 396/379; 396/175; 396/62
(58) Field of Search ................... 396/61, 62, 175, 396/349, 379, 383, 538, 411, 418

(56) References Cited

U.S. PATENT DOCUMENTS 5,036,346 A  *  7/1991  Hatamori et al. ........... 396/148

FOREIGN PATENT DOCUMENTS

JP  10-312014  * 11/1998  ........... G03B/17/02

* cited by examiner

Primary Examiner—Russell Adams
Assistant Examiner—Andrew Sever
(74) Attorney, Agent, or Firm—Arnold International; Bruce Y. Arnold

(57) ABSTRACT

A film transport gear mechanism is mounted on an upper portion of an internal body frame of a camera, and held rotatably from the top by a gear holding plate (51). The gear holding plate is integrally formed with a finder frame (50) that holds a viewfinder optical system, light emitting and receiving sections (48, 49) of an autofocus device and a photometry device (54) thereon. A slit (75) is formed between the gear holding plate and the finder frame, so the gear holding plate and the finder frame are interconnected merely through narrow connecting portions (76, 77). Warps and deformations in the gear holding plate are absorbed into the silt and not transmitted to the finder frame.

8 Claims, 5 Drawing Sheets

COMPACT CAMERA

BACKGROUND OF THE INVENTION

1. Field of the Invention

The present invention relates to a compact camera, and more particularly to an improvement in the camera that reduces the number of parts of the camera and makes the camera more compact and low cost, without damaging the performance of the camera.

2. Background Arts

Reducing both the manufacturing cost and the size of the compact camera has been continually searched for. For this purpose, devices for uniting components of the camera to reduce the number of parts and the number of manufacturing processes have conventionally been developed. When uniting any components, functions of these components and the requisite accuracy are taken into consideration. For example, concerning light emitting and receiving sections of an autofocus device, or a viewfinder optical system, as they require accuracy in positioning, elements of these components are mounted in an integral frame to constitute an united finder assembly. Then, the finder assembly is attached to the top of an internal body frame of the camera.

On the other hand, a gear mechanism for rotating a spool of a film cartridge and a gear holding plate for holding gears of this mechanism rotatably from the top are usually disposed in the vicinity of the finder assembly. Accordingly, it is preferable to form the gear holding plate integrally with the frame of the finder assembly, for the sake of reducing the number of parts and the assembling processes. However, the gear holding plate tends to be deformed by the driving force transmitted from the gear mechanism. Where the gear holding plate is integrated with the frame of the finder assembly, the deformation of the gear holding plate results deviating the light emitting or receiving section of the autofocus device or the finder optical system.

In order to prevent such deviations, a camera disclosed in JPA 10-312014 suggests securing an integral frame member to an internal body frame of the camera body, at a border portion of a gear holding plate portion to a finder frame portion, by means of a screw. Thereby the deformation of the gear holding plate portion is not transmitted to the finder frame portion, which prevents deviation of the elements mounted in the finder frame portion, including the light emitting and receiving sections and the finder optical system.

However, since the gear holding plate portion of this prior art is warped by the screwing, and the warp in the gear holding plate portion is transmitted to the finder frame portion, the elements mounted in the finder frame portion can deviate from their proper positions. Moreover, because vibrations of the gear holding plate portion, which are generated from the movement of the gear mechanism, are transmitted to the finder frame portion, the accuracy of the autofocus device will be lowered if the range finding operation is carried out while the gear mechanism is being activated to wind up the photo filmstrip.

SUMMARY OF THE INVENTION

In view of the foregoing, an object of the present invention is to provide a compact camera, wherein a finder frame and a gear holding plate are formed as an integral part to reduce the number of parts of the camera and thus make the camera more compact and low cost, but the influence of deformations, warps and vibrations in the gear holding plate onto the finder frame is sufficiently eliminated.

To achieve the above and other objects, a camera of the present invention comprises a finder frame holding a finder optical system and at least light emitting and receiving sections of an autofocus device; a gear holding plate formed integrally with the finder frame, the gear holding plate holding gears of a film transport gear mechanism rotatably; and a slit formed between the finder frame and the gear holding plate.

The film transport gear mechanism is disposed on an upper portion of an internal body frame of the camera, with top ends of the gears held by the gear holding plate. It is preferable to secure the finder frame and the gear holding plate to the internal body frame of the camera by screws on opposite sides of the slit.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
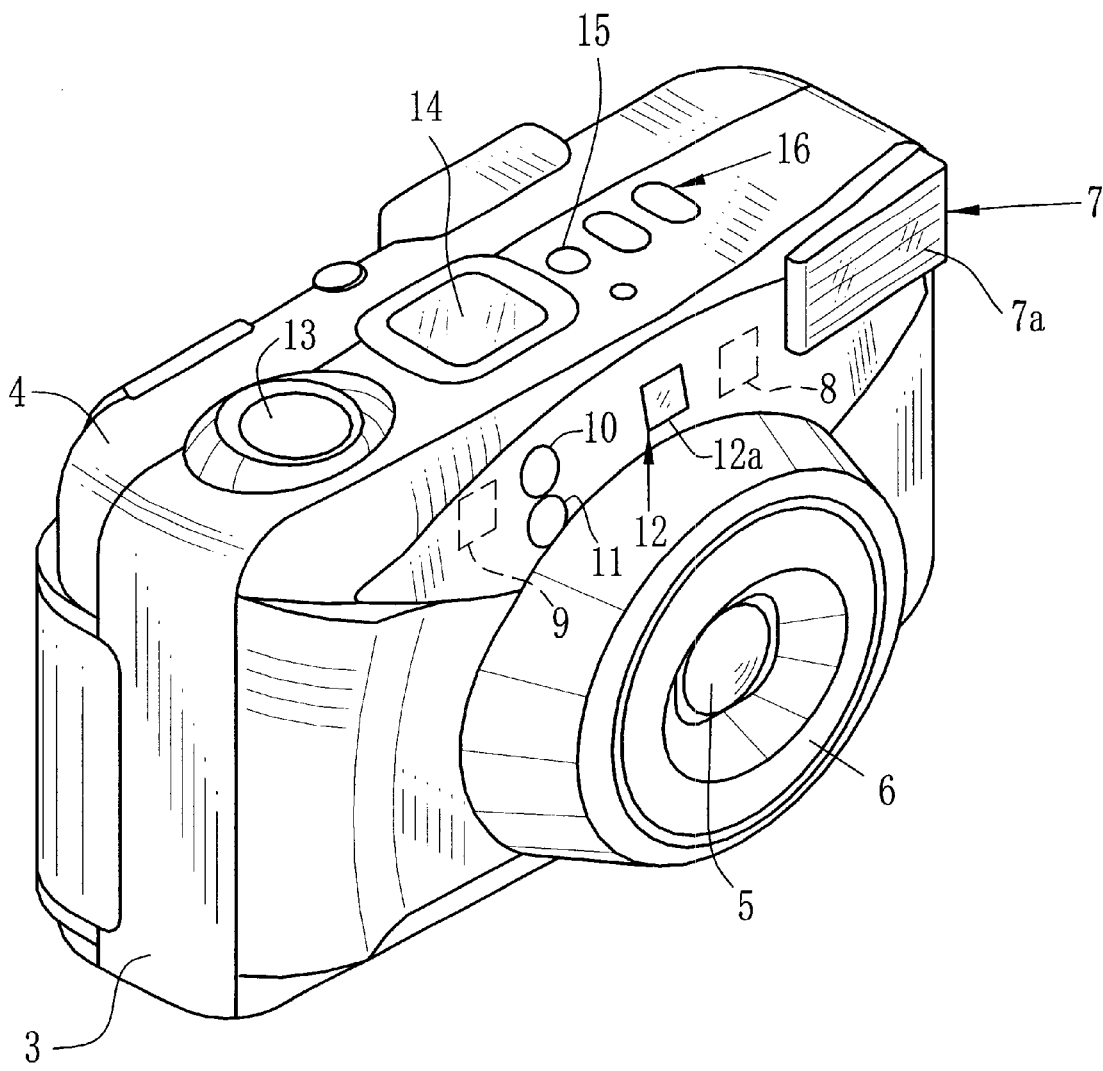
FIG. 1 shows a perspective view of a compact zoom camera according to an embodiment of the present invention.
Figure 2:
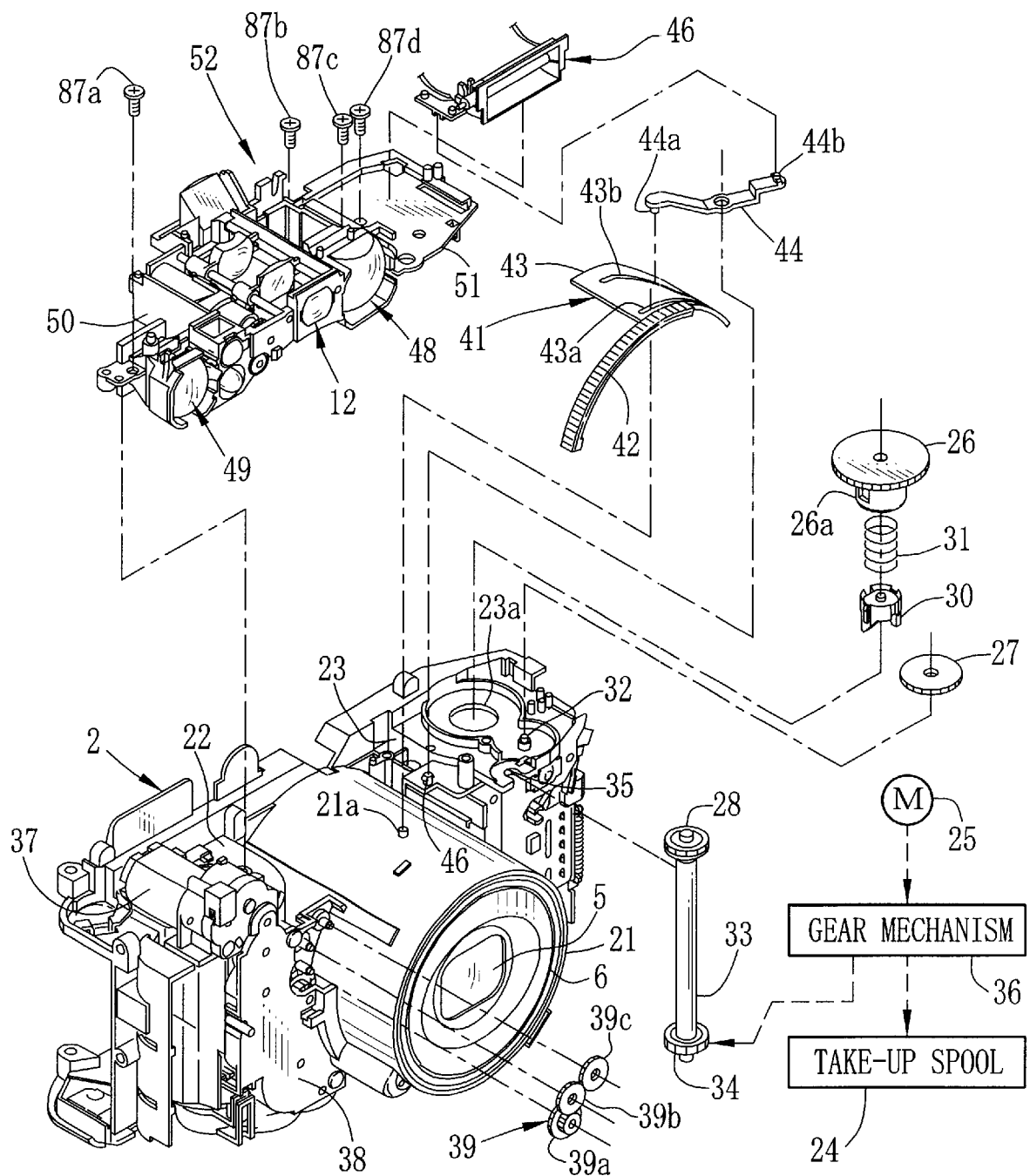
FIG. 2 shows an exploded perspective view of an internal structure of the camera.

As shown in FIGS. 1 and 2, a camera embodying the present invention has a camera body consisting of an internal body frame 2 on which mechanical and electronic elements are mounted, and front and rear covers 3 and 4 covering the front and rear of the internal body frame 2.

A lens barrel 6 of a taking lens 5, a protector 7a of a zoom flash device 7, a light projecting window 8, a light receiving window 9, a photometry window 10, a red-eye reduction light projecting window 11 and a finder objective window 12a of a zooming viewfinder 12 are disposed on the front of the camera body. The protector 7a is made of a condenser lens that is usually a Fresnel lens. A shutter release button 13, an LCD panel 14 displaying information on the camera and photography, a power switch 15 and operation buttons 16 for setting up a photography mode and the like are disposed on the top of the camera body. Although they are omitted from the drawing, a finder eyepiece window, zoom buttons for zooming the taking lens 5 and a rear lid for loading a film cartridge are provided on the rear side of the camera body.

As shown in FIG. 2, a fixed barrel 21 is disposed in the center of the internal body frame 2, and the movable lens barrel 6 is accommodated in the fixed barrel 21. A take-up chamber 22 and a cartridge chamber 23 are disposed on opposite sides of the fixed barrel 21. The film take-up chamber 22 is provided with a take-up spool 24, that is rotated by a film transport motor 25 to wind up the photo filmstrip thereon. The film transport motor 25 is located inside the take-up spool 24. Above the cartridge chamber 23 are disposed a film transport gear mechanism consisting of a drive gear 26 and gears 27 and 28. The drive gear 26 has a cylindrical engaging portion 26a on its bottom side. A drive shaft 30 is engaged with the engaging portion 26a such that the drive shaft 30 rotates together with the drive gear 26, but is movable up and down along a rotary axis of the drive gear 26. The drive shaft 30 is engaged with a not shown spool of the cartridge through an opening 23a that is formed through a top wall of the cartridge chamber 23.

The drive gear 26 is rotatably mounted atop the cartridge chamber 23 by fitting the engaging portion 26a in the opening 23a. A coiled spring 31, which is located inside the engaging portion 26a urges the drive shaft 30 to protrude into the cartridge chamber 23. The gear 27 is pivotally fitted on an axle 32 that is formed on the top wall of the cartridge chamber 23.

The gear 28 is formed integrally at an upper end of a rotary shaft 33. The rotary shaft 33 has a gear 34 formed integrally at its lower end. The rotary shaft 33 has a small diameter portion below the upper gear 28, and the small diameter portion is fitted in a cutout 35 of the internal body frame 2, that is formed adjacent to the top wall of the cartridge chamber 23. The lower end of the rotary shaft 33 is fitted in a not-shown pivot hole of the internal body frame 2. In this way, the rotary shaft 33 is mounted rotatably to the internal body frame 2.

The film transport motor 25 is rotatable in opposite directions, and the rotational movement of the film transport motor 25 is transmitted to a gear mechanism 36 that is disposed on the bottom of the internal body frame 2. The gear mechanism 36 consists of a plurality of gears, including epicyclical gears, and transmits the rotational movement of the film transport motor 25 to one of the take-up spool 24 and the gear 34, while disconnecting the other from the film transport motor 25.

The camera of this embodiment is of a pre-winding type where the photo filmstrip is almost entirely would up onto the take-up spool 24 immediately after the film cartridge is loaded in the film take-up chamber 22 and the rear lid is closed, and the photo filmstrip is rewound into the cartridge shell one frame after each exposure. To wind up the photo filmstrip onto the take-up spool 24, the film transport motor 25 is rotated continuously in a forward direction, and the forward rotation of the film transport motor 25 is transmitted to the take-up spool 24 through the gear mechanism 36, causing the take-up spool 24 to rotate in a winding direction. To rewind the photo filmstrip into the cartridge shell, the film transport motor 25 is rotated reversely, and the reverse rotation of the film transport motor 25 is transmitted through the gear mechanism 36 and the gears 34, 28 and 27 to the drive gear 26, causing the drive shaft 30 and thus the cartridge spool to rotate in a rewinding direction.

A lens drive motor 37 is disposed on the internal body frame 2 above the film take-up chamber 22. The lens drive motor 37 drives the movable lens barrel 6 to move back and forth for zooming. The driving power of the lens drive motor 37 is transmitted to the movable lens barrel 6 through a not-shown gear train that is mounted behind a gear cover 38. The driving power of the lens drive motor 37 is also used for zooming the zooming viewfinder 12 and for changing the illuminating angle of the zoom flash device 7. For this purpose, the rotational movement of the lens drive motor 37 is transmitted from the lens drive gear train to an interconnection gear train 39 that consists of three gears 39a, 39b and 39c.

A zoom interconnection member 41 is mounted on an outer periphery of the fixed barrel 21. The zoom interconnection member 41 is an integral member consisting of an arc gear 42 and a cam plate 43. A guide slot 43a and a cam slot 43b are formed through the cam plate 43. The zoom interconnection member 41 is mounted movable in the circumferential direction of the 21 as the guide slot 43a is engaged on a pin 21a that is formed on the outer periphery of the fixed barrel 21. The gear 42 is in mesh with the gear 39c of the interconnection gear train 39, so the zoom interconnection member 41 is moved in the circumferential direction of the 21 in cooperation with the zooming of the taking lens 5. The cam slot 43b is engaged with a cam follower pin 44a of an interconnection lever 44.

The interconnection lever 44 is pivoted on a pin 46 that is provided vertically on an upper portion of the internal body frame 2, and has the cam follower pin 44a at its one end, and an engaging pin 44b at its other end. The engaging pin 44b is engaged with a movable flash projector 46 of the zoom flash device 7, as shown in detail in FIG. 3.

The movable flash projector 46 is mounted on a frame portion 51 that is formed integrally with a finder frame 50, and the zooming viewfinder 12, a light emitting section 48 and a light receiving section 49, a red-eye reduction LED 54, a photometry section 55 are mounted on the finder frame 50. Thus, these elements mounted on the finder frame 50 and the frame portion 51 constitute an united finder assembly 52, and this assembly 52 is mounted atop the internal body frame 2 of the camera body.

Figure 4:
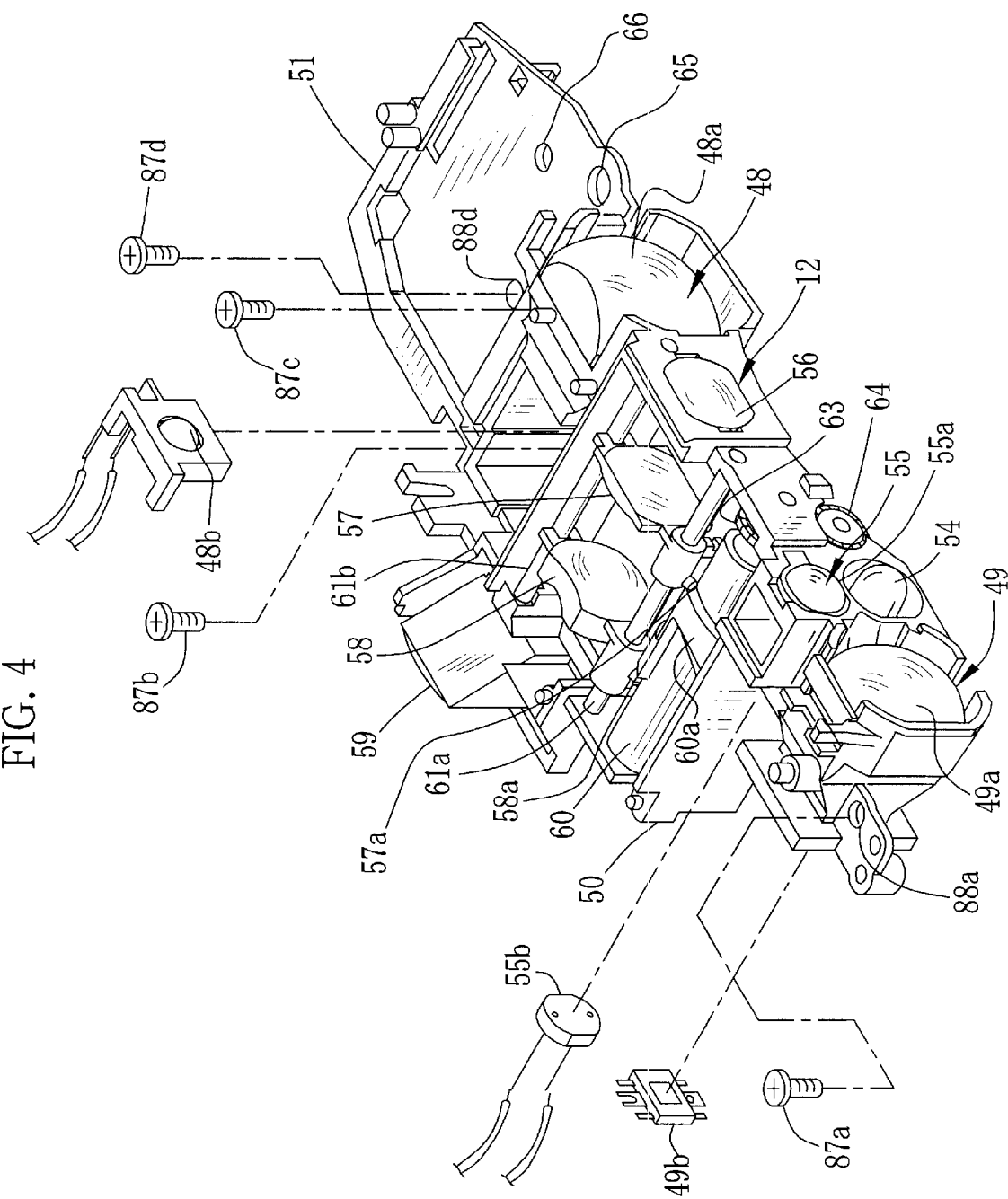
FIG. 4 shows a perspective view of a finder assembly of the camera.

As shown in FIG. 4, the light emitting section 48 mainly consists of a projection lens 48a and an infrared light emission diode (IRED) 48b, and projects an infrared ray through the light projecting window 8 toward a subject. The light receiving section 49 mainly consists of a lens 49a and a position sensing device (PSD) 49b, and is located behind the light receiving window 9 to receive the reflected infrared ray from the subject. The PSD 49b outputs a subject distance signal in accordance with an incident position of the infrared ray. The photometry section 55, which is located behind the photometry window 10, consists of a lens 55a and a photo sensor 55b, e.g. a CdS sensor, to measure a subject brightness. The red-eye reduction LED 54 projects light out through the red-eye reduction light projecting window 11 when the shutter release button 13 is pressed halfway.

The zooming viewfinder 12 is constituted of an objective lens 56, movable lens 57 and 58, an eyepiece 59 integrated with a prism, and a cam shaft 60. The movable lenses 57 and 58 are supported by a pair of sliding guide rods 61a and 61b which extend in parallel to an optical axis of the taking lens 5, such that the movable lenses 57 and 58 are slidable along the axial direction. The movable lenses 57 and 58 are coupled to each other through a not-shown spring that urges them toward each other.

The movable lenses 57 and 58 are respectively provided with cam follower pins 57a and 58a. The cam follower pins 57a and 58a are engaged with a helical cam ridge 60a that is formed around the outer periphery of the cam shaft 60, such that the cam follower pins 57a and 58a nip the cam ridge 60a between them by virtue of the urging force of the spring. A gear 63 is securely mounted to a front end of the cam shaft 60. The gear 63 is in mesh with a transmission gear 64 that meshes with the gear 42 of the zoom interconnection member 41. According to this configuration, the zoom interconnection member 41 rotates as the zoom interconnection member 41 moves in the circumferential direction in cooperation with the zooming of the taking lens 5, so the cam follower pins 57a and 58a slide along the helical cam ridge 60a, changing the axial position of the movable lenses 57 and 58, to change the finder magnification.

Where the finder assembly 52 is mounted atop the internal body frame 2, the frame portion 51 is located above the cartridge chamber 23, and holds the drive gear 26 and the gears 27 and 28 from the top, such that these gears 26 to 28 are rotatable in a space between the frame portion 51 and the internal body frame 2. Accordingly, the frame portion 51 doubles as a gear holding plate. As shown in detail in FIG. 5A, the gear holding plate portion 51 is formed with holes 65 and 66. The hole 65 is fitted on an upper end of the rotary shaft 33, thereby preventing the rotary shaft 33 from slipping off the internal body frame 2. The hole 66 is fitted on the axle 32 of the gear 27, thereby to hold the gear 27 rotatably. The hole 66 and the axle 32 double as a device for positioning the finder assembly 52 to the internal body frame 2.

A pair of guide rails 71 and 72 are integrally formed on the top of the gear holding plate portion 51 in a parallel direction to the optical axis of the taking lens 5, for holding the movable flash projector 46 between them and guiding the movable flash projector 46 to slide along the axial direction. The guide rails 71 and 72 have an inverted L-shape. The guide rail 71 borders on the finder frame 50, and has a channel 71a along the bottom side of a top wall portion of the guide rail 71. A stop wall 71b is integrally formed on a front end of the guide rail 71, to limit the forward movement of the movable flash projector 46. The stop wall 71b interconnects a side wall of the finder frame 50 with the top side of the gear holding plate portion 51. The guide rail 72 extends along an opposite edge of the gear holding plate portion 51 from the guide rail 71.

Figure 5A:
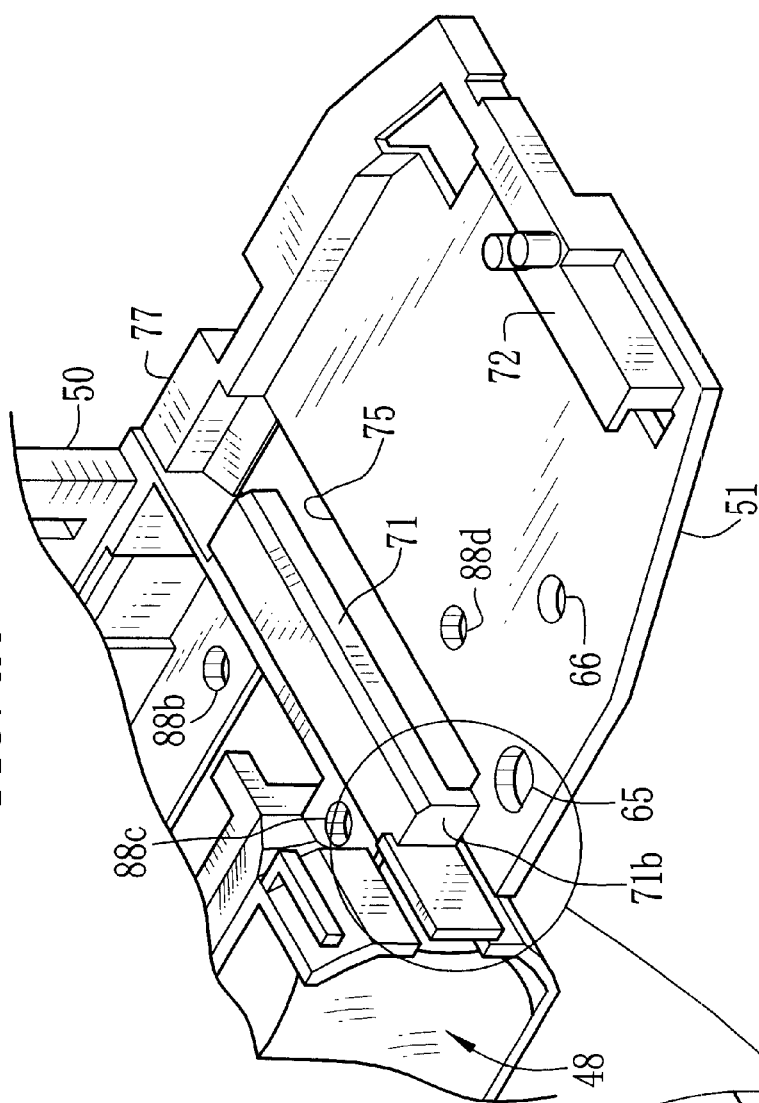
FIG. 5 shows an enlarged fragmentary view of a gear holding plate portion of the finder assembly.
Figure 5B:
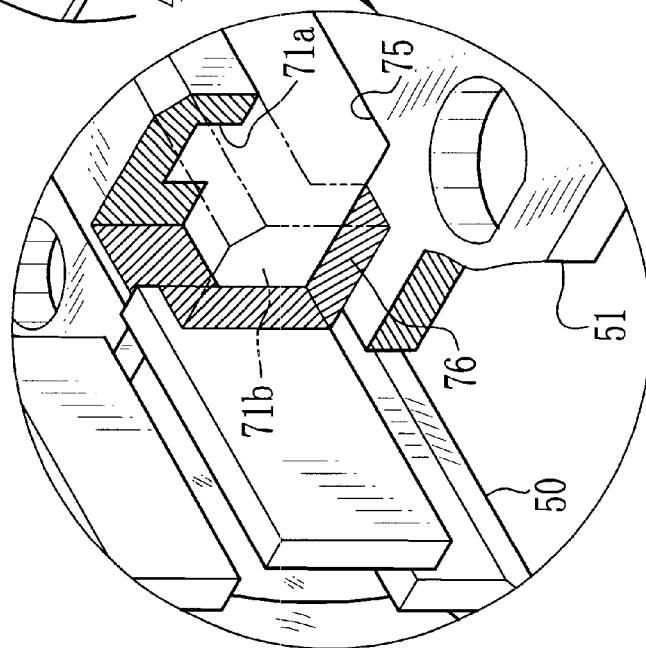

A slit 75 is formed along the border between the finder frame 50 and the gear holding plate portion 51, from the base of the stop wall 71b to the proximity of the rear end of the gear holding plate portion 51. Consequently, the finder frame 50 and the gear holding plate portion 51 are interconnected as the integral part through narrow connecting portions 76 and 77 and the stop wall 71b, as shown in FIGS. 5A and 5B. Because of the slit 75 formed along the border between the finder frame 50 and the gear holding plate portion 51 to connect them merely through the narrow connecting portions 76 and 77, if the gear holding plate portion 51 is warped, the warp is absorbed by the slit 75, and thus hardly transmitted to the finder frame 50. It is to be noted that the slit 75 may have an open end on the front side or the rear side of the gear holding plate portion 51.

Figure 3:
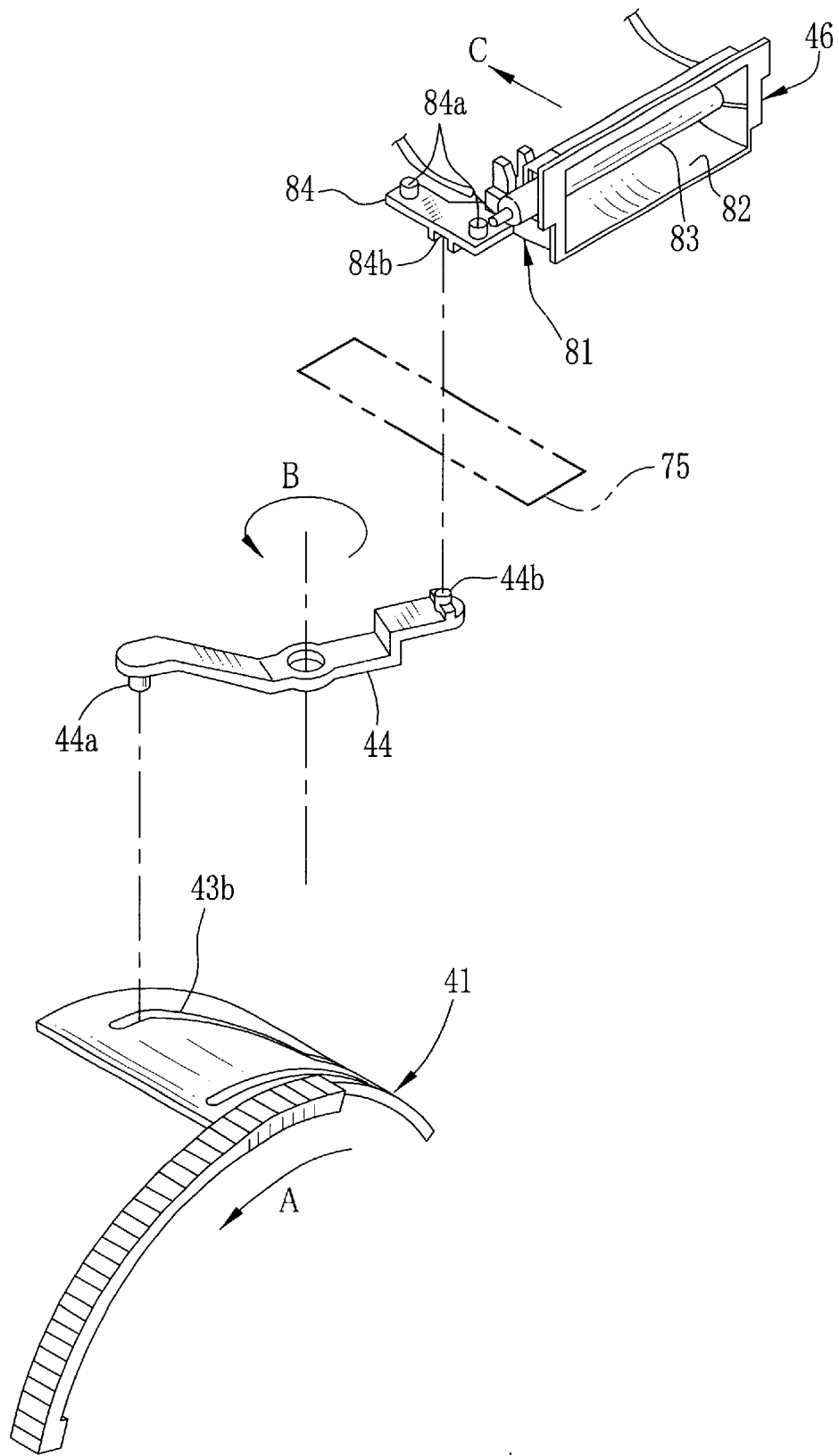
FIG. 3 shows an explanatory diagram illustrating an operation of an interconnection mechanism between a zoom lens and a flash device.

As shown in FIG. 3, the movable flash projector 46 is constituted of a movable frame 81, a reflector 82 held in the movable frame 81, and a flash discharge tube 83. An interconnection leg 84 is formed integrally with the movable frame 81, protruding sideways from the bottom of the movable frame 81. The interconnection leg 84 has a pair of guide pins 84a formed integrally on its top side, and an engaging portion 84b formed integrally on its bottom side. The movable flash projector 46 is mounted on the top of the gear holding plate portion 51, with its guide pins 84a engaged in the channel 71a of the guide rail 71 and the engaging portion 84b engaged in the slit 75. The engaging portion 84b consists of a pair of ridges between which the engaging pin 44b of the interconnection lever 44 is engaged. Accordingly, the slit 75 not only prevents transmission of the warp in the gear holding plate portion 51 to the finder frame 50, but also functions as a guide slit for the movable flash projector 46, and constitutes an element of the interconnection mechanism between the movable flash projector 46 and the zoom interconnection member 41. Although it is not shown in the drawings, an engaging leg is formed on the opposite side of the movable frame 81 from the interconnection leg 84, and is engaged in the guide rail 72. In this way, the movable flash projector 46 is mounted slidable along the guide rails 71 and 72 on the gear holding plate portion 51.

For instance when the taking lens 5 is zoomed toward the telephoto side, the zoom interconnection member 41 slides on the periphery of the fixed lens barrel 21 in a counterclockwise direction in FIG. 5, as shown by an arrow A, so the interconnection lever 44 rotates counterclockwise as shown by an arrow B, causing the movable flash projector 46 to slide backward as shown by an arrow C. As a result, the distance between the movable flash projector 46 and the protector 7a increases, so the illuminating angle of the flash light is reduced.

On the contrary, when the taking lens 5 is zoomed toward the wide-angle side, the zoom interconnection member 41 and the interconnection lever 44 turns reversely, i.e. clockwise in this instance, so the movable flash projector 46 is caused to slide forward. As a result, the distance between the movable flash projector 46 and the protector 7a decreases, and the illuminating angle of the flash light is widened.

As shown in FIG. 2, the finder assembly 52 is secured to the internal body frame 2 by use of four screws 87a, 87b, 87c and 87d. As shown in FIG. 2, the screw 87a is inserted in a hole 88a that is formed through the finder frame 50 at an end portion beside the light receiving section 49. On the other hand, as shown in FIG. 5, the screws 87b and 87c are inserted respectively in holes 88b and 88c that are formed through the gear holding plate portion 51 in the proximity of the border on the gear holding plate portion 51, whereas the screw 87d is inserted in a hole 88d that is formed through the gear holding plate portion 51 in the proximity of the slit 75. Screwing both the finder frame 50 and the gear holding plate portion 51 in the border zone contributes to reducing the influence of vibrations of the gear holding plate portion 51 on the finder frame 50, even though the gear holding plate portion 51 vibrates as the drive gear 26 and the gears 27 and 28 rotate for rewinding the photo filmstrip into the cartridge shell. Accordingly, the range finding operation performed through the light emitting and receiving sections 48 and 49, which are mounted on the finder frame 50, would not be affected by the vibration of the gear holding plate portion 51 as caused by the film rewinding operation.

Because the slit 75 is formed along the border between the finder frame 50 and the gear holding plate portion 51, if the gear holding plate portion 51 is warped as it is screwed, the warp is absorbed by the slit 75, and thus hardly transmitted to the finder frame 50. If the finder frame 50 should be warped and the light emitting section 48 should deviate, the projecting direction of the infrared ray and thus the incident position of the reflected ray on the PSD 49b deviate correspondingly, so the measured subject distance would not be precise. Such a problem would not occur in the camera of the present invention because the warp in the gear holding plate portion 51 is absorbed by the slit 75. According to the configuration of the present invention, the elements of the zooming viewfinder 12, as mounted on the finder frame 50, are maintained in the proper positions, so any malfunction in the zooming viewfinder 12 would not be resulted from the film rewinding operation.

Although the present invention has been described with respect to the pre-winding type compact camera shown in the drawings, the present invention is applicable to a camera where the photo filmstrip is wound up onto the take-up spool one frame after each exposure. In that case, the gear holding plate portion may be located above a film take-up chamber that is located on the opposite side from a cartridge chamber, to hold a gear mechanism for rotating a take-up spool.

Thus, the present invention is not to be limited to the above embodiment but, on the contrary, various modifications will be possible to those skilled in the art without departing from the scope of claims appended hereto.

What is claimed is:

1. A camera comprising a finder optical system and a film transport gear mechanism, said camera comprising:
   a finder frame holding said finder optical system and at least light emitting and receiving sections of an autofocus device;
   a gear holding plate formed integrally with said finder frame, said gear holding plate holding gears of said film transport gear mechanism rotatably; and
   a slit formed between said finder frame and said gear holding plate.

2. A camera as recited in claim 1, wherein said film transport gear mechanism is disposed on an upper portion of an internal body frame of said camera with top ends of said gears held by said gear holding plate.

3. A camera as recited in claim 2, wherein said film transport gear mechanism is provided for rotating a spool of a film cartridge as loaded in a cartridge chamber of said camera, and disposed atop said cartridge chamber.

4. A camera as recited in claim 2, wherein said finder frame and said gear holding plate are mounted atop said internal body frame of said camera, and secured to said internal body frame by screws on opposite sides of said slit.

5. A camera as recited in claim 4, further comprising a zoom lens and a zoom flash device, wherein a flash projector of said zoom flash device is mounted on a top side of said gear holding plate such that said flash projector is movable back and forth to change a distance to a condenser lens of said zoom flash device, and wherein said slit doubles as a guide slit for said flash projector.

6. A camera as recited in claim 5, wherein said flash projector is engaged via said slit with an interconnection mechanism disposed below said finder frame, said interconnection mechanism transmitting zooming motion of said zoom lens to said flash projector.

7. A camera as recited in claim 6, wherein said finder optical system are mounted movable on said finder frame, to constitute a zooming viewfinder.

8. A camera as recited in claim 1, wherein a photometry device for measuring a subject brightness and a red-eye reduction light projecting device are mounted on said finder frame.

* * * * *